(12) United States Patent
McElroy, Jr. et al.

(10) Patent No.: US 6,509,563 B1
(45) Date of Patent: Jan. 21, 2003

(54) METHOD FOR REDUCTION IN THE INTERFERENCE OF COSMIC RAY-INDUCED NEUTRON EVENTS IN PASSIVE NEUTRON COINCIDENCE AND MULTIPLICITY COUNTING

(75) Inventors: Robert D. McElroy, Jr., Middletown, CT (US); Marcel F. Villani, New Britain, CT (US)

(73) Assignee: Canberra Industries, Inc., Meriden, CT (US)

( * ) Notice: Subject to any disclaimer, the term of this patent is extended or adjusted under 35 U.S.C. 154(b) by 0 days.

(21) Appl. No.: 09/509,618
(22) PCT Filed: Jul. 27, 1999
(86) PCT No.: PCT/US99/16956
§ 371 (c)(1), (2), (4) Date: Mar. 28, 2000
(87) PCT Pub. No.: WO00/25148
PCT Pub. Date: May 4, 2000

(51) Int. Cl.$^7$ .................................................. G01S 3/00
(52) U.S. Cl. ...................................... 250/291; 259/290
(58) Field of Search ................................. 250/390, 391, 250/392, 358.1, 359.1

(56) References Cited

U.S. PATENT DOCUMENTS 4,483,816 A * 11/1984 Caldwell et al. ............ 259/390

* cited by examiner

Primary Examiner—Hung Xuan Dang
(74) Attorney, Agent, or Firm—John H. Crozier

(57) ABSTRACT

In a preferred embodiment, a method of enhancing the neutron coincidence assay of low fissile mass samples, by combining assay precision improvement algorithms with novel background and matrix correction algorithms, to provide lower levels of detection with higher confidence that the reported results are not subject to biases resulting from environmental or sample matrix effects.

3 Claims, No Drawings

METHOD FOR REDUCTION IN THE INTERFERENCE OF COSMIC RAY-INDUCED NEUTRON EVENTS IN PASSIVE NEUTRON COINCIDENCE AND MULTIPLICITY COUNTING

CROSS-REFERENCE TO RELATED APPLICATIONS

The present application is a 371 of PCT/US99/16956, filed Jul. 27, 1999. Benefit is claimed of the filing date of U.S. Provisional Application Serial No. 60/094,416, filed Jul. 28, 1998.

TECHNICAL FIELD

The present invention relates to non-destructive assay using neutron coincidence/multiplicity counting generally, but not by way of limitation, to a novel method for reduction in the interference of cosmic-ray induced neutron events and improvements in the measurement precision and accuracy.

BACKGROUND ART

Passive Neutron Coincidence Counting, including those systems utilizing multiplicity analysis, is commonly used to detect the presence of radio-activity in industrial samples. With the large amount of process wastes generated from operating nuclear facilities and the current interest in preparing stored materials for disposal in long term repositories such as the Waste Isolation Pilot Plant, which is the national repository for waste, the need for improvements in the performance of existing and new assay systems is expected to grow. The current neutron coincidence counting practices are limited in sensitivity due to the relatively low neutron yield from the nuclides of interest, large and variable background count rates, and interference from the non-radioactive components of the sample. These limitations result in biases in the assay result and the need for long assay times.

Methods applied to date to improve the sensitivity of neutron coincidence counting include statistical filtering (M. S. Krick and W. C. Harker "Multiplicity User's Guide" LA-UR-93-1394 (1993), J. A. Mason, et.al. "Absolute Measurements of Waste using a Neutron Multiplicity Drum Monitor", 38$^{th}$ Annual Meeting of the International Nuclear Materials Management, Jul. 20–24, 1997), increasing detection efficiency (H. O. Menlove et.al. "HENC" Performance Evaluation and Plutonium Calibration, LA-13362-MS, (1997)), multiplicity counting (N. Ennslin, et. al., "Expected Precision of Neutron Multiplicity Measurements of Waste Drums", LA-UR-95-2275, Presented at the INMM 36$^{th}$ Annual Meeting, Jul. 9–12, 1995), and truncation of the multiplicity distribution (LANL).

The statistical filtering techniques improve the precision of the measurement by reducing, but not eliminating, the influence of fluctuations in cosmic-ray induced neutron background. The assay or count is divided into several shorter counts, based on an expected normal distribution of count rates, outliers are rejected on the assumption that the cosmic-ray induced neutron events are large and will result in a disparate count rate in the count rate for the cycle. For traditional coincidence counting these filters were applied to the total neutron count-rate, accidental coincidence rate, and the real coincidence rates. With the application of multiplicity counting to low mass samples, the filtering has been applied to the singles, doubles and triples rates. These filters have resulted in precision improvements on the order of 10 to 20% (e.g. a drop from 10% without the filters to 8% with the filters).

Since Multiplicity counting has been applied to low mass samples, attempts have been made to utilize the higher moments of the distributions, the triples and quads (M. S. Krick, "Thermal Neutron Multiplicity Counting of Samples with Very Low Fission Rates, Presented at the Institute of Nuclear Materials Management 38$^{th}$ Meeting, Jul. 20–24, 1997; M. Pickrell et.al. "Application of Neutron Multiplicity Counting to Waste Assay",), rates to improve the sensitivity and precision of the assay. It was found that the assay precision degraded by using these higher moments, although some improvement in the accuracy may have been achieved (N. Ennslin et. al. "Expected Precision of Neutron Multiplicity Measurements of Waste Drums", LA-UR-95-2275 (1995),).

An improved neutron detection system has been developed for larger sample sizes where sensitivity improvements have the greatest potential impact in terms of applications. The High Efficiency Neutron Coincidence Counter (H. O. Menlove et. al. "HENC" Performance Evaluation and Plutonium Calibration, LA-13362-MS, (1997)) was developed in a Cooperative Research And Development Agreement (CRADA) between LANL and Canberra to provide a large sample (200 liter drum) system with properties optimized for high sensitivity and accuracy in the assay of low mass samples. This system incorporated high detection efficiency, neutron detection short die-away time, and minimized the mass of high-Z materials in the construction of the system. The prototype system met its design objectives however, no new analysis techniques or algorithms were published or released by LANL as an end product of this CRADA.

The multiplicity distribution has recently, been utilized to improve the assay precision of low mass Cf-252 samples (M. S. Krick, "Thermal Neutron Multiplicity Counting of Samples with Very Low Fission Rates, Presented at the Institute of Nuclear Materials Management 38$^{th}$ Meeting, Jul. 20–24, 1997). It was observed that over 95% of the coincident neutrons from a non-multiplying sample would result in multiplicities of 3 neutrons or less. Events of higher multiplicity could be attributed to cosmic-ray induced neutrons events. [The cosmic-ray impacting with the substance of the counter produces a spallation event which includes many neutrons.] By rejecting any event with multiplicity of greater than 3 neutrons the effect of cosmic-ray events would be minimized. However, the reference does not discuss the limitations of this approach. For instance, fissile samples with a large fraction of non-correlated neutron events, such as plutonium flouride, would disturb the multiplicity distribution and could introduce large errors into the assay result. Additionally, this approach does not remove the cosmic-ray induced neutron events with multiplicities of less than 4 neutrons.

This analysis of the literature indicates that many of the tools needed to provide a precise and accurate assay of low fissile mass samples by neutron coincidence counting have been developed. However, a coherent protocol for integrating these techniques is required to gain the full benefit of these techniques. The analysis of the literature indicates that there are no suitable methods to fully determine the cosmic-ray induced neutron events generated within the sample or to correct the measured background rates for the moderating effects of the sample's matrix.

Accordingly, it is a principal object of this invention to provide a method and a methodology for the complete treatment of the cosmic-ray induced neutron background and improvements in the precision of the assay by minimizing the impact of the fluctuations and magnitude of this background.

It is a further object of the invention to provide a method to separate the cosmic-ray induced neutron events generated within the sample's matrix constituents.

It is an additional object of the invention to provide a method to correct the measured background rates for the moderating effects of the sample's matrix constituents.

Other objects of the present invention, as well as particular features, elements, and advantages thereof, will be elucidated in, or be apparent from, the following description.

DISCLOSURE OF INVENTION

The present invention achieves the above claims, among others, by providing, in a preferred embodiment, a method of enhancing the neutron coincidence assay of low fissile mass samples, by combining assay precision improvement algorithms with novel background and matrix correction algorithms, to provide lower levels of detection with higher confidence that the reported results are not subject to biases resulting from environmental or sample matrix effects. The techniques are as follows:

1. Sample Moderator Background Correction for matrix moderation effects by adaptation of the Add-A-Source Technique for correction of the fissile signal strength.
2. Known Matrix Method for Cosmic-Ray Induced Background Correction: Prior knowledge of the sample matrix is used for subtraction of the cosmic-ray induced neutron signal due to the high-Z components of the sample matrix from the neutron signal from the fissile content of the matrix.
3. Cosmic Ray Rejection Algorithms, using standard or truncated multiplicity rates corrects the cosmic-ray induced neutron component of the measured background rates without prior knowledge of the sample matrix.

BEST MODE FOR CARRYING OUT THE INVENTION

This invention makes use of a seemingly unrelated development to distinguish between neutron events from Curium, Californium and Plutonium isotopes (Rinard et. al. "Applications of Curium Measurements for safeguarding at Large-scale Reprocessing Plants", ESARDA 19th Annual Symposium on Safeguards and Nuclear Material Management Proceedings (ESARDA 28; EUR 17665 EN), 1997 PP. 221-5). This technique makes use of the uniqueness of the multiplicity distributions of these isotopes. That is, that the average number of neutrons and coincident neutrons varies significantly for these isotopes. This invention applies the same argument to the characteristic multiplicity distribution from cosmic-ray events.

Background Reduction Techniques

1. Background Correction for Sample Moderation

The moderating effect of the sample reduces the system's neutron detection efficiency. A correction for these moderating effects on neutrons emitted by the sample has been documented (H. O. Menlove, "Passive Neutron Assay Heterogeneous Waste Drums Using the Segmented Add-A-Source Method", "LA-UR-95-1989, (1995)). However, the moderator content of the sample impacts the detection efficiency for background neutrons as well. Note that the change in detection efficiency is not the same for background neutrons as for neutrons emitted within the sample. The change in the detection efficiency for background neutrons has been previously untreated. If this effect is not corrected an assay bias will result.

This technique provides a background correction for sample moderation effects. The Add-A-Source (AAS) matrix correction was developed to correct the moderating effects of the sample on the fission neutrons emitted from the sample. We have found that AAS matrix correction measurement may be modified to determine a correction factor for the cosmic-ray induced background. Similar to the AAS technique a polynomial form is adequate to represent the true background rate based on the local background conditions and the measured AAS perturbation.

$$C_{S-f}(S_p), C_{D-f}(D_p), C_{T-f}(T_p) \tag{2}$$

where $C_S$, $C_D$, $C_T$ are the singles, doubles and triples correction factors respectively, the functional form of the correction factor is a polynomial, and $S_p$, $D_p$ and $T_p$ are the measured AAS singles, doubles and triples perturbation factors respectively. The measured background rates, without the sample, are multiplied by these correction factors to provide an accurate background subtraction. A calibration at each facility is required.

The matrix moderator effect on the external background rates is small for reflective matrices (e.g. steel) but can be as large as a factor of 2 for 200 liter samples containing the equivalent of 50 kg of water. Without proper correction the effect leads to statistically significant negative net count rates on nonradioactive samples. At higher elevations this effect can introduce negative biases of 2 grams of weapons grade Pu. With proper calibration, this technique eliminates the bias.

2. Known Matrix Method

The assay of a sample containing high-Z materials such as steel or lead will result in a positive bias if the increased signal due to cosmic-ray induced neutrons is not corrected. When the high-Z component of the sample matrix is known by either process knowledge or by radiographic examination (RTR) it is possible to adjust the measured neutron rates by an empirically determined correction factor.

The correction factors must be calibrated at each installation due to the changes in cosmic-ray influence as a function of altitude and local environment. The correction factors have been seen to have a linear relationship as a function of the mass of the high-Z component. The correction factors are as follows:

$$C_S = \sum_i a_{zi} \cdot m_{zi} \tag{1}$$

$$C_D = \sum_i b_{zi} \cdot m_{zi}$$

$$C_T = \sum_i c_{zi} \cdot m_{zi}$$

where $C_S$, $C_D$ and $C_T$ are the singles, doubles and triples correction factors, respectively, $a_{zi}$, $b_{zi}$, and $c_{zi}$ are the calibration coefficients for each element, $m_{zi}$ is the mass of the high-Z elements (e.g. lead and steel), and where the summations are carried out over each high-Z constituent within the sample. The measured background rates, without the sample, are multiplied by these correction factors to provide an accurate background subtraction. The correction factor parameters a, b, c are each dependent on the daily changes in the cosmic-ray flux. A normalization measurement prior to the start of each day's operation is required.

The magnitude of the background (bias) correction is equivalent to 50 mg weapons grade plutonium per kilogram of lead for measurements conducted in Los Alamos, N. Mex. (elevation ~8000 feet). The accuracy of this technique is limited by the quality of the data used to determine the mass of the high-Z matrix components.

3. Cosmic-Ray Rejection Algorithm

This algorithm allows direct measurement of the matrix induced background increase using multiplicity analysis without prior knowledge of the matrix composition for the sample and produces a corrected mass measurement. The singles, doubles, and triples neutron coincidence rates from the cosmic ray induced background have characteristic multiplicities different from those obtained from measurement of Pu standards.. These differences can be used to distinguish between the plutonium and background neutrons. The Singles (S), Doubles (D) and Triples (T) rates for various background materials are determined at each system location. The cosmic-ray induced neutrons are removed by solving a simple set of linear equations based on the observed doubles and triples rates.

$$m_{Pu} = \frac{c_z \cdot D - b_z \cdot T}{b_{Pu} \cdot c_z - c_{Pu} \cdot b_z}, \qquad m_z = \frac{b_{Pu} \cdot T - c_{Pu} \cdot D}{b_{Pu} \cdot c_z - c_{Pu} \cdot b_z} \qquad (3)$$

where $m_{Pu}$ is the sample's Pu-240 effective mass, $m_z$ is the high-Z mass of the sample (e.g. the number of kilograms of lead or steel). D and T are the measured doubles and triples rates respectively and $a_{Pu}$, $b_{Pu}$, $c_{Pu}$, $a_z$, and $c_z$ are empirically determined calibration coefficients.

The above equations were written for determination of Pu-240 effective mass but may be applied to any fissile material with the appropriate calibration coefficients. Similarly, the equations specify element Z which typically represent a high-Z material. Calibrations specific to lead, steel, copper, etc can be utilized to provide a measurement of the mass of one of these materials within the sample. However, if it is not desired to measure this mass then a single calibration such as for lead has been seen to provide an accurate fissile mass. That is, it is not necessary to calibrate for the specific high-Z material in the sample to obtain an accurate fissile mass.

Table 2. shows a data set obtained at laboratory at an altitude of about 8000 feet. The cosmic-ray induced neutron background level was quite high leading to significant biases in the assay result with out the cosmic-ray rejection algorithms.

TABLE 1

Comparison of traditional coincidence analysis techniques with the cosmic-ray rejection algorithm.

| Drum Content | | Standard NCC | High-Z Correction | |
|---|---|---|---|---|
| Lead Mass | Declared Pu Mass (g) | Reported Total Pu (g) | Reported Total Pu (g) | Lead Mass (kg) |
| 76.3 | 0 | 2.73 ± 0.160 | −0.020 ± 0.073 | 7.6 kg ± 5.2 |
| 109 | 0 | 4.78 ± 0.242 | 0.015 ± 0.077 | 108.7 kg ± 5.5 |
| 109 | 0.262 | 4.62 ± 0.180 | 0.280 ± 0.094 | 116.4 kg ± 6.6 |
| Drum with 130 kg Borated Glass | | | | |
| 0 | 0 | 0.000 ± 0.014 | −0.035 ± 0.008 | −1.3 kg ± 0.5 |
| 0 | 0.262 | 0.330 ± 0.048 | 0.235 ± 0.073 | 1.2 kg ± 4.7 |
| 0 | 0.262 | 0.419 ± 0.037 | 0.252 ± 0.061 | 1.4 kg ± 3.9 |

If the precise chemical form of the fissile material within the sample is known or fixed over all the expected samples, it is possible to apply the same formulas using the singles and doubles rates. However, if this chemical form is not know or fixed the doubles and triples rates must be utilized.

IMPROVEMENTS FROM THE INVENTION

A representative data set for non-radioactive samples is shown in Table 2, indication an overall reduction in the assay bias of a factor of 10 and a reduction in standard deviation of the results of a factor of 6 by utilizing the most appropriate algorithms.

TABLE 2

Comparison of Empty Drum Assay Results using Standard coincidence analysis algorithms with the automated selection process incorporating the improvements of this invention.

| Matrix Drum | Standard NCC | Current Work |
|---|---|---|
| Poly Beads (128 kg) | −0.187gPu | −0.007gPu |
| Partical Board (168 kg) | −0.069gPu | 0.006gPu |
| Bkg (No Drum) | −0.065gPu | −0.035gPu |
| PDP Style Foam | −0.037gPu | −0.035gPu |
| SOFTBOARD | −0.012gPu | 0.015gPu |
| Q2 Foam | −0.008gPu | −0.009gPu |
| Mixed Heterogenous | −0.006gPu | 0.022gPu |
| 29.5 kg Poly Beads | 0.000gPu | 0.013gPu |
| Empty Drum | 0.006gPu | −0.007gPu |
| STEEL/COMBUST | 0.014gPu | 0.018gPu |
| COMBUSTIBLES | 0.015gPu | 0.021gPu |
| STEEL/COMBUST | 0.042gPu | 0.010gPu |
| Cement Rubble (dry) | 0.042gPu | −0.019gPu |
| Poly Beads (68 kg) | 0.050gPu | −0.017gPu |
| Layered Heterogenous | 0.060gPu | −0.001gPu |
| SAND (340 kg) | 0.070gPu | −0.027gPu |
| Sample Steel | 0.270gPu | 0.020gPu |
| Heavy Steel | 0.374gPu | −0.002gPu |
| Average | 0.031gPu | −0.002gPu |
| Standard Deviation | 0.123gPu | 0.019gPu |

System Hardware Requirements

One objective of this invention was to develop algorithms and analyses that were independent of the manufacturer of the neutron counting system or neutron counting electronics. The invention can be used with simple passive meutron coincidence counters, neutron multiplicity counters, or active neutron acquisition systems when operated in the passive acquisition mode.

The above techniques can be utilized with most neutron coincidence counting systems. They are of primary benefit to those systems utilized for the assay of low fissle masses or waste containers. These algorithms have been tested on systems for waste assay, developed by Canberra Industries, Inc., including the JCC-21 and WM3100 Waste Drum Assay Systems (designated WDAS by the International Atomic Energy Agency), and the High Efficiency Neutron Counter (HENC). These are 200 liter drum waste assay devices, with the Add-A-Source matrix correction system, intended for measurement of a few milligrams to several hundred grams of plutonium in various matrices. These matrices include but are not limited to combustibles, metals, salts, and ash. These algorithms would be applicable to several other neutron counting systems such as the N94 and N95 systems manufactured by AEA Harwell, of Harwell, England amoung others. Additional applications include passive neutron well counters used for both waste and safeguards applications. This type of system would include but not be limited to the Flat-Square Coincidence Counter, the High Level Neutron Coincidence Counter and the Plutonium Scrap Multiplicity Counter. These systems do not typically include the AAS correction technique, however, the introduction of the AAS to these systems is possible in either a manual or automated fashion.

At present, the systems tested have utilized either the Canberra 2150 and JSR-14 multiplicity counting modules, however, the MSR-4 module, developed by Los Alamos National Laboratory, the LANL designed AMSR-150 and the Aquilla PSR-B, furnished by Aquilla, of Albuquerque, N. Mex., have essentially the same functionality as the Canberra units. For limited operation in the coincidence only modes a standard shift register such as the Canberra JSR-12 unit can be utilized. These algorithms are not limited to use with Canberra supplied shift registers and can be used with other manufacturer's shift registers or "time correlation modules" as well as with data acquired in List Mode (time tagged event by event recording).

What is claimed is:

1. A method of improving the accuracy of passive neutron counting and multiplicity counting, comprising:

(a) measuring a rate of neutrons emitted by a mass; and (b) multiplying said rate by a correction factor to reduce the number of cosmic-ray induced neutron events in said rate, said correction factor being calculated by one of the equations:

$$C_S = f(S_p), C_D = f(D_p), C_T = f(T_p)$$

where $C_S$, $C_D$ and $C_T$ are the singles, doubles and triples correction factors respectively, the functional form of the correction factor is a polynomial, and $S_p$, $D_p$ and $T_p$ are the measured AAS singles, doubles and triples perturbation factors, respectively.

2. A method of improving the accuracy of passive neutron counting and multiplicity counting, comprising:

(a) measuring a rate of neutrons emitted by a mass; and (b) multiplying said rate by a correction factor to reduce the number of cosmic-ray induced neutron events in said rate, said correction factor being calculated by one of the equations:

$$C_S = \sum_i a_{zi} \cdot m_{zi}$$

$$C_D = \sum_i b_{zi} \cdot m_{zi}$$

$$C_T = \sum_i c_{zi} \cdot m_{zi}$$

where $C_S$, $C_D$ and $C_T$ are the singles, doubles and triples correction factors, respectively, $a_{Zi}$, $b_{Zi}$, and $c_{Zi}$ are the calibration coefficients for each element, $m_{Zi}$ the mass of the high-Z elements (e.g. lead and steel), and where the summations are carried out over each high-Z constituent within the sample.

3. A method of directly measuring matrix induced background increase without prior knowledge of matrix composition for a sample emitting neutrons, said method comprising: solving the linear equations:

$$m_{Pu} = \frac{c_z \cdot D - b_z \cdot T}{b_{Pu} \cdot c_z - c_{Pu} \cdot b_z}, \quad m_z = \frac{b_{Pu} \cdot T - c_{Pu} \cdot D}{b_{Pu} \cdot c_z - c_{Pu} \cdot b_z}$$

where $m_{Pu}$ is the sample's Pu-240 effective mass, $m_z$ is the high-Z mass of the sample (e.g. the number of kilograms of lead or steel). D and T are the measured doubles and triples rates respectively and $a_{Pu}$, $b_{Pu}$, $c_{Pu}$, $a_Z$, $b_Z$, and $c_Z$ are empirically determined calibration coefficients.

* * * * *